United States Patent [19]
McMennamy et al.

[11] Patent Number: 4,912,984
[45] Date of Patent: Apr. 3, 1990

[54] QUICKLY INSTALLED LOAD MEASURING APPARATUS AND ASSOCIATED SYSTEM

[75] Inventors: John A. McMennamy; Bruce T. Boone, both of Cobb County; James H. Jenkins, Gwinnett County, all of Ga.

[73] Assignee: Movats Incorporated, Marietta, Ga.

[21] Appl. No.: 168,161

[22] Filed: Mar. 15, 1988

[51] Int. Cl.⁴ ............................. G01L 1/22; G01L 1/26
[52] U.S. Cl. ............................... 73/862.65; 73/862.31; 73/862.38; 73/862.49
[58] Field of Search ........... 73/862.49, 862.31, 862.62, 73/862.38, 862.65, 862.49, 862.38, 862.31, 862.62, 862.65

[56] References Cited

U.S. PATENT DOCUMENTS

| | | | |
|---|---|---|---|
| 2,775,887 | 1/1957 | Hines | 73/862.38 |
| 3,093,578 | 6/1963 | Hofmeister | 73/862.54 |
| 3,199,057 | 8/1965 | Gindes et al. | 73/862.65 |
| 3,213,680 | 10/1965 | Schaefer | 73/862.38 |
| 4,570,903 | 2/1986 | Crass | 73/862.31 |

OTHER PUBLICATIONS

Wheatstone Bridge Nonlinearity TN-139, Micro-Measurements, 1974.

*Primary Examiner*—Charles A. Ruehl
*Attorney, Agent, or Firm*—Louis T. Isaf

[57] ABSTRACT

A load measuring apparatus is, in preferred embodiments, preassembled in a ready-to-use, portable assembly and comprises a load bearing body providing a deformable link between a shaft housing (such as a valve operator) and a shaft which moves relative to the housing, and which deformable, load bearing body functions as the support for a shaft engaging element of the invented device; and also comprises strain gauges measuring the deformation of the load bearing body, which deformation is related to the thrust of the shaft; load measuring apparatus operating in association with a signal conditioning device and display/recording device by which measurements are conveyed and interpreted; in the preferred embodiment, the load measuring apparatus includes an overload shear washer incorporated to prevent damage to the shaft housing by shearing away and allowing continued, unblocked movement of the shaft.

25 Claims, 5 Drawing Sheets

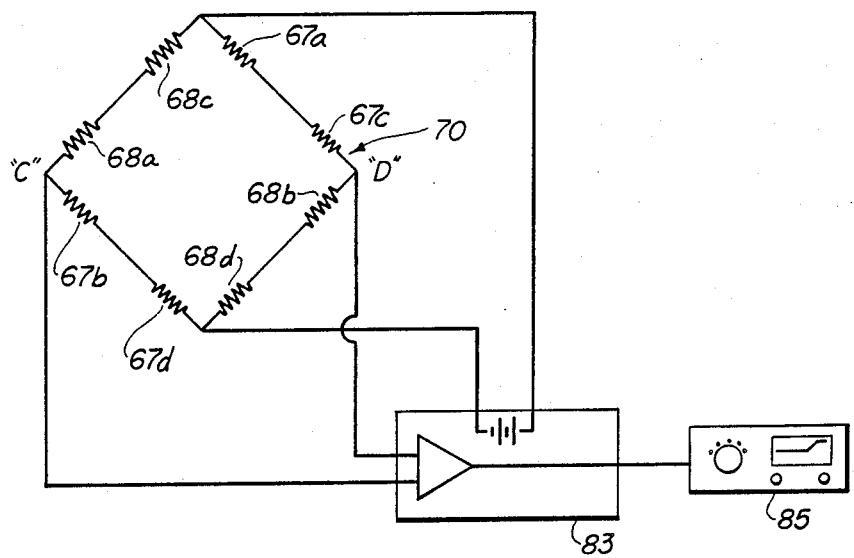
FIG 5
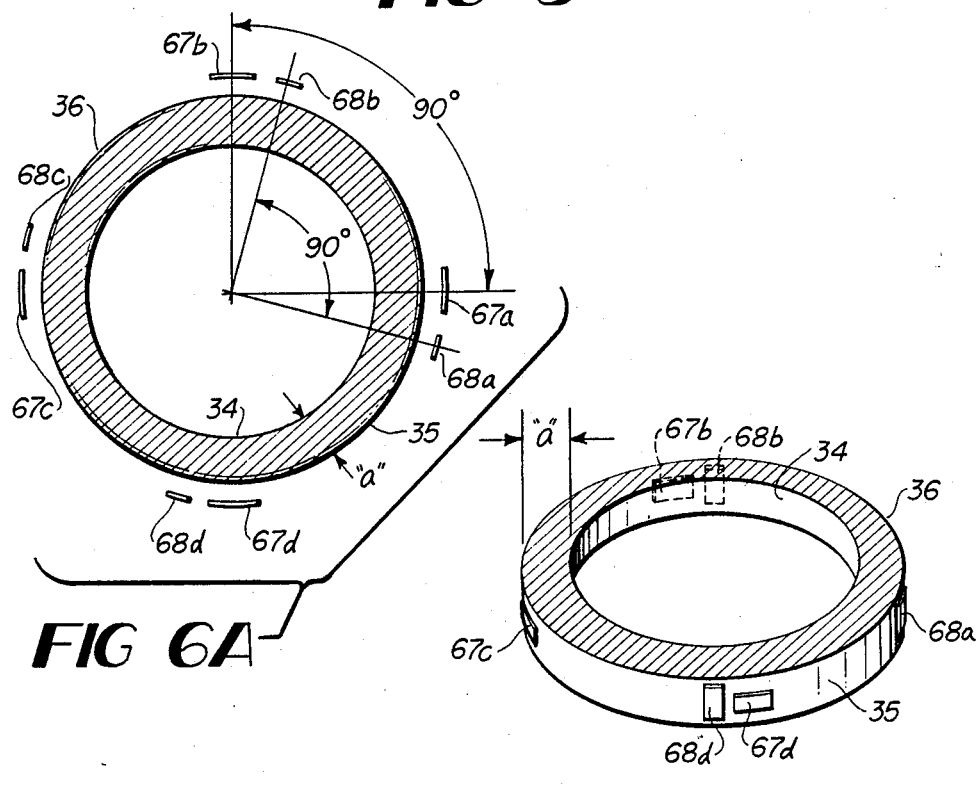
FIG 6A
FIG 6B

QUICKLY INSTALLED LOAD MEASURING APPARATUS AND ASSOCIATED SYSTEM

FIELD OF THE INVENTION

This invention relates generally to the field of load measuring devices, and more specifically to load measuring devices used in combination with valve operators in the art of valve diagnostics.

BACKGROUND OF THE INVENTION

To understand the prior art upon which the present invention seeks to improve, attention is directed to the specification of U.S. Pat. No. 4,542,649, issued to Charbonneau et al (the "649 Patent"). Specifically, attention is directed to the "Stem Load Calibration Device" in which a load cell disc is suspended by a plurality of rods above a fixed (or relatively fixed) object. In the case of the 649 Patent, the "fixed" object is a valve operator housing. The load disc device of the 649 Patent is of a type which measures compressive forces exerted directly on a load bearing surface of the load cell body by a shaft (or shaft extension) moving relative to the "fixed" housing. There are other load measuring mechanisms with varying arrangements of the load bearing surfaces, shaft blocking components and strain gauges which have attempted, with varying degrees of success, to perform the function of the stem load measuring device of the 649 Patent.

In spite of the availability of numerous load measuring mechanisms, the need for improvements has been noted. For example, the Stem Load Calibration Device of the 649 Patent has found extensive application as part of valve diagnostic equipment utilized to diagnose valve and valve operator conditions within nuclear power plants. When working in a nuclear environment, there exists the desired and need to accomplish tasks as quickly as possible. The 649 Patent, Stem Load Calibration Device and other known load measuring mechanisms include a plurality of separate components which are assembled on site at the valve operator; or, in some cases, the load measuring mechanisms include few parts but require some degree of disassembly and reassembly of the valve operator. A second example of an area for improvement is that many prior art load measuring mechanisms offer no protection against overloading of the valve operator. As such, extremely large and potentially damaging forces can be built up within the operator during the diagnostic process.

SUMMARY OF THE INVENTION

Briefly described, the present invention comprises a load measuring apparatus which can be pre-assembled as a ready-to-use device and portably carried to the location where measurement of the load delivered by a shaft moving relative to a shaft housing is accomplishable with minor or no preparation of the shaft and shaft housing. In the preferred embodiments, the apparatus of the present invention is outfitted for quick screw-in mounting to the existing, threaded pipe tap in the upper bearing housing of an existing valve operator, such as Limitorque Corporation operator models "00", "0", "1" and "2".

The load measuring apparatus of the preferred embodiment of the present invention, briefly, comprises a load bearing body providing a deformable "link" between a shaft housing (such as a valve operator) and a shaft which moves relative to the housing. That same deformable, load bearing body functions as the supports for the shaft engaging element of the invented device. Strain gauges measure the deformation of the load bearing body, which is related to the thrust of the shaft.

In the preferred embodiment, the load measuring apparatus includes an overload shear washer incorporated to prevent damage to the shaft housing by shearing away and allowing continued, unblocked movement of the shaft.

Preferred embodiments of the Load Measuring System of the present invention comprises the Load Measuring Apparatus operating in association with a signal conditioning device and display/recording device by which measurement are conveyed and interpreted.

It is, therefore, an object of the present invention to provide a load measuring apparatus which can be quickly and easily installed at a valve operator.

Another object of the present invention is to provide a load measuring apparatus which is preassembled, portable and ready-to-use with little preparation at the measuring site.

Still another object of the present invention is to provide a load measuring apparatus which provides overload protection.

Yet another object of the present invention is to provide a portable, quickly assembled and operated Load Measuring System.

Other objects, features and advantages of the present invention will become apparent upon reading and understanding this specification when taken in conjunction with the accompanying drawings.

BRIEF DESCRIPTION OF THE DRAWINGS

FIG. 5 is a electrical schematic of Load Measuring System of the present invention.

FIGS. 6A and 6B are representative diagrams showing relative angular placement of strain gauges about the main body member of the Load Measuring Apparatus in accordance with the preferred embodiment of the present invention.

DETAILED DESCRIPTION OF THE PREFERRED EMBODIMENTS

Figure 1:
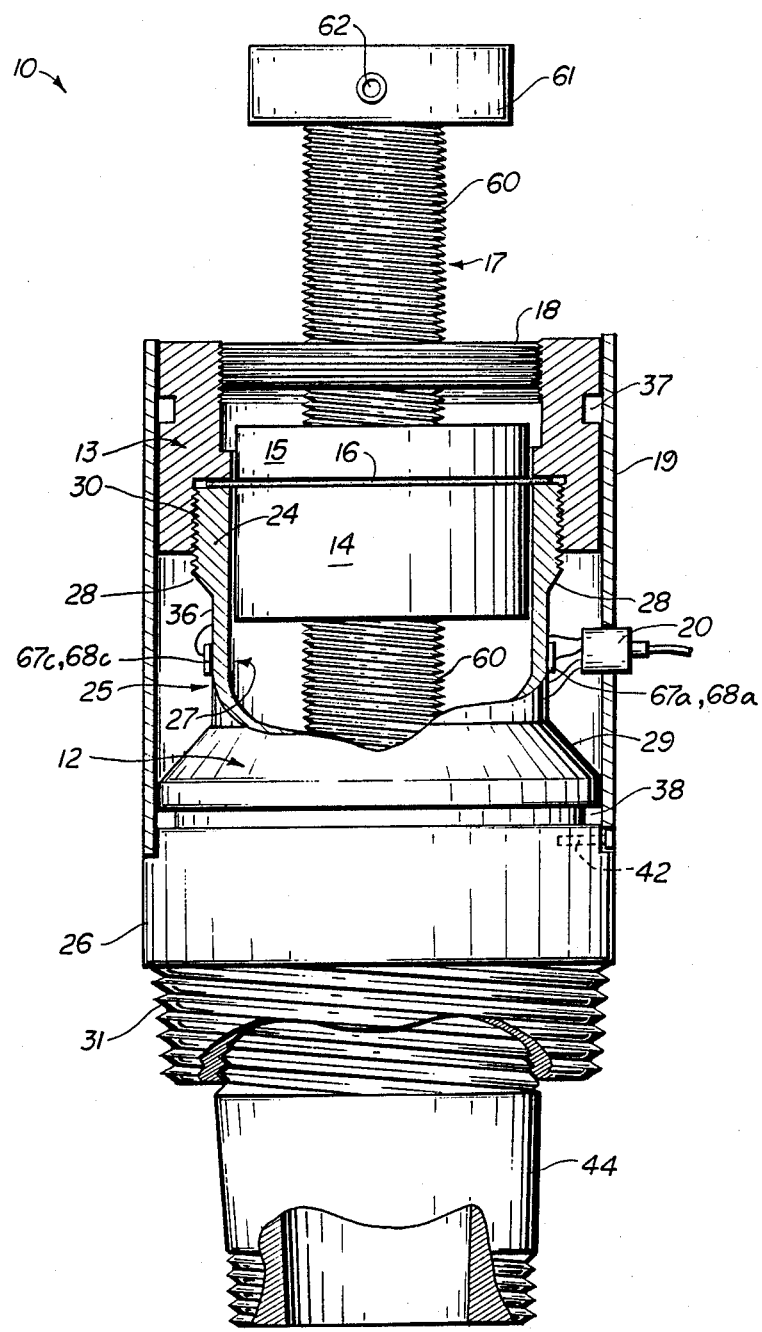
FIG. 1 is a cutaway, side view of the Load Measuring Apparatus of the present invention, showing an embodiment with overload protection.

Referring now in greater detail to the drawings in which like numerals represent like components throughout the several views, the Load Measuring Apparatus 10 of a preferred embodiment of the present invention is seen in FIG. 1 as including a main body member 12, an upper shear nut 13, an end plug 14, a plug cover 15, a shear washer 16, a stem extension 17, a stop washer 18 and a protective sleeve 19.

The main body member 12 is a single elongated, component formed preferably from a material which is rigid and yet elastic within the range of forces anticipated to be exerted on it and which exhibits a known, preferably linear relationship between the amount of force exerted on it and the amount of deformation experienced as results of the exerted force. Steel is the preferred material. The body member 12 is seen as being formed into, basically, three cylindrical portions, the upper portion 24, intermediate portion 25, and the lower portion 26. A cylindrical, axial passage 27 extends through the main body member 12. The upper portion 24 and lower portion 26 are each formed along at least part of their outer circumference with threading 30, 31. The intermediate portion 25 is precisely machined (or otherwise manufactured) to a predetermined outer diameter such that the thickness "a" between the inner wall 34 and outer wall 35 is predetermined thickness along a test region 36 of the intermediate portion 25. Other features of the main body member 12 include: a groove 38 for accepting an "O" Ring to seal against foreign material; and a tap hole 42 for attaching the sleeve 19. An adapter 44 (or adapters) is provided in alternate embodiments to selectively reduce (or enlarge) the diameter of the threaded section 31 of the lower portion 26.

Figure 4:
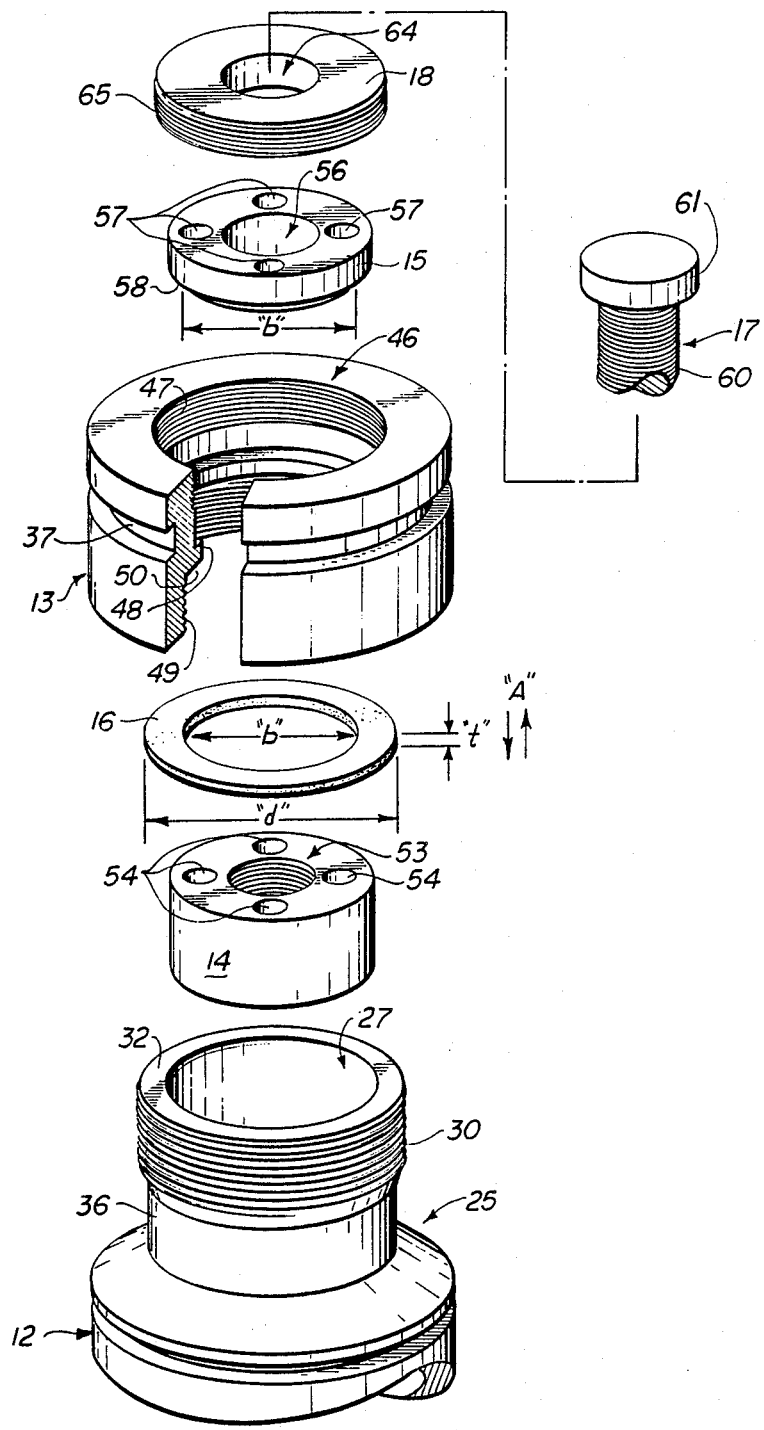
FIG. 4 is an isolated, exploded side view of overload protection features of the Load Measuring Apparatus of FIG. 1.

The upper sheer nut 13 is formed with a central passage 46 defined by three inner wall segments 47, 48, 49 (see FIG. 4). Two of the inner wall segments 47, 49 are internally threaded. A ledge 50 is formed between the two lower wall segments 48, 49. A groove 37 is included to accept a sealing "O" Ring.

The end plug 14 is a slightly elongated, disc-shaped component which includes a threaded, central passage 53 and four, threaded screw taps 54. The plug cover 15 is a disc-shaped component including a central passage 56 and four, screw accepting holes 57 passing through the disc. The plug cover 15 and plug 14 are of equal diameters and their screw holes/taps 57, 54 and central passages 56, 53 are in alignment when assembled. The plug cover 15 also includes an annular inset 58 and the screw holes 57 are set radially inward from the annular inset 58. The inner diameter "b" of the annular inset 58 is equal to the inside diameter of the shear washer 16.

The shear washer 16 is of a typical washer shape having: an inside diameter equal to the inner diameter "b" of the annular inset 58; and an outside diameter "d" equal to or less than the inside diameter of the bottom, inner wall segment 49 but greater than the inside diameter of the center, inner wall segment 48 of the shear nut 13. The shear washer 16 is formed from a material of known shear strength ("s"), and the thickness ("t") of the shear washer is precisely determined such that the washer will shear at a predetermined shearing force (as represented by arrows "A"), using the formula [t=shearing force−sl$\pi$], "l" being the diameter of the washer at the shear point, which, in the disclosed embodiment is the inside diameter of inner wall segment 48. The material of the shear washer is preferably steel.

The stem extrusion 17 is comprised of an elongated, threaded rod 60 and a head 61 held to the rod by a set screw 62. The stop washer 18 is a disc shaped component having a central passage 64 through which the rod 60, but not the head 61, can pass. The outer periphery 65 of the stop washer 18 is threaded for threaded engagement with the upper, inner wall segment 47 of the shear nut 13. The stop washer 18 is preferably made of a material such as plastic. The protective sleeve 19 is seen as including an amphenal connector 20 mounted thereto.

With reference again to FIG. 1, the Load Measuring Apparatus 10 is also seen as including strain gauges 67, 68 mounted to the test region 36 of the main body member 12. Whereas, in alternate embodiments, measurements are taken using known arrangements of strain gauges utilizing just one, two or more gauges, the disclosed embodiment of the drawings utilizes eight strain gauges 67a, 67b, 67c, 67d, 68a, 68b, 68c, 68d arranged as follows: four gauges 67a–67d are oriented to measure deformation of the test region in the axial direction, that is, aligned with the maximum principal strain. The four, "principal strain" gauges 67a–67d are preferably mounted to the test region 36 at locations equally spaced between the upper and lower chamfers 28, 29 of the body member 12 intermediate portion 25, and are spaced apart with one gauge at every 90 degrees circumferentially about the test region. See FIGS. 6A and 6B. Four other gauges 68a–68d are oriented to measure deformation of the test region 36 in the circumferential direction. These four, "Poisson" gauges 68a–68d are preferably mounted to the test region 36 at locations equally spaced between the upper and lower chamfers 28, 29, adjacent the principal strain gauges 67a–67d, and spaced apart with one poisson gauge at every 90 degrees circumferentially about the test region. See FIGS. 6A and 6B.

The electrical arrangement among the strain gauges 67a–67d, 68a–68d is that of a Wheatstone Bridge 70 as shown, in its preferred arrangement, in the schematic of FIG. 5. The operation of the strain gauges 67, 68 and of the Wheatstone Bridge 70 are as known in the industry and more detailed explanation than given herein is considered unnecessary for clear understanding and performance of the present invention. Each strain gauge 67–68 is, in the herein disclosed embodiment, of the type gauge which exhibits a varying electrical resistance in response to experienced strain. Each gauge represents a resistance in one arm of the Bridge 70. As the compression or tension forces are experienced at the test region 36, the strain experienced by each gauge 67–68 is represented as a change in resistance within the respective arm of the Bridge 70. The "unbalanced" Wheatstone Bridge generates a voltage across terminals "C" and "D". The voltage across terminals "C" and "D" is directed to a signal conditioning device 83.

Figure 2:
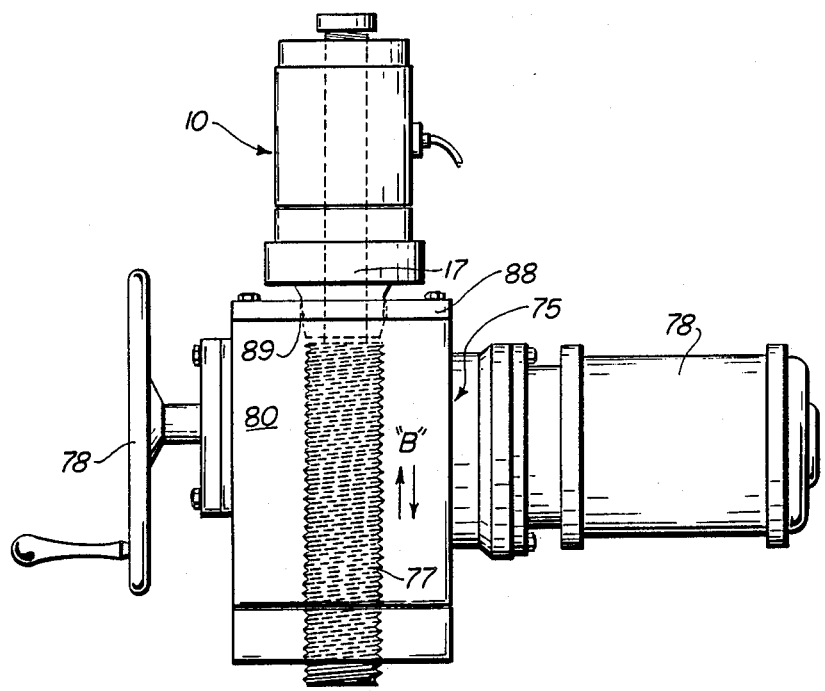
FIG. 2 is a side view of the Load Measuring Apparatus of FIG. 2 shown mounted on a valve operator, with parts cutaway.
Figure 3:
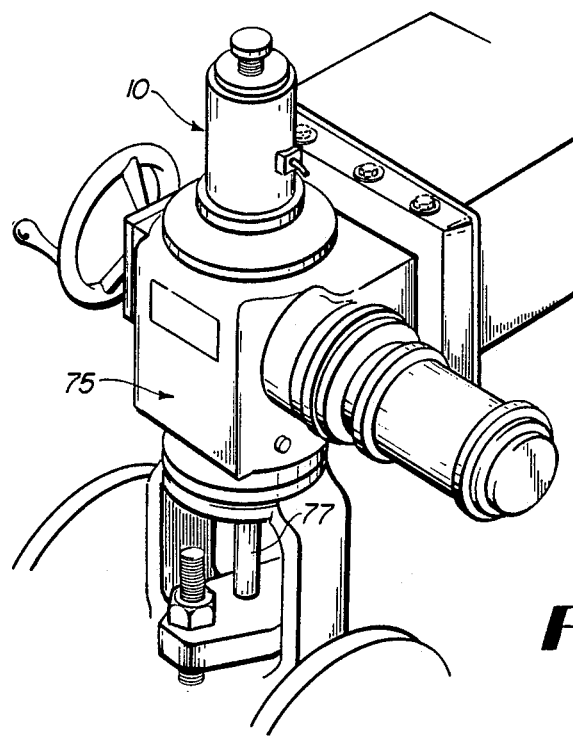
FIG. 3 is a pictorial view of the Load Measuring Apparatus of FIG. 1, installed on a valve operator.

One embodiment of the present invention, and a preferred method of the present invention, includes the Load Measuring Apparatus 10 and system in conjunction with a valve operator 75 and is used to measure the stem load exerted on the valve steam 77 by the driving mechanism 78 of the valve operator. Attention is directed to FIG. 2. The operator 75 is a valve operator of a type typical of the industry, such as Limitorque Corporation operator model "00", "0", "1" and "2". The valve operator 75 includes a valve shaft 77 driven in an axial direction relative to the operator housing (as indicated by arrows "B") by a motor or hand wheel and gearing arrangement (not shown). The Load Measuring Apparatus 10, although can be transported in pieces and assembled at the location of use, is preferably preassembled to a condition which is ready-to-use with simple mounting of the apparatus 10 to the operator housing. The Load Measuring Apparatus 10 is pre-assembled by placing the shear washer 16 between the end plug 14 and plug cover 15 with the shear washer fit within the annular inset 58 of the plug cover. Screws extending through the screw holes 57 of the plug cover 15 are drawn tightly into the screw taps 54 of the end plug 14 to, thus, draw the end plug and plug cover together in a manner of a vise to rigidly grip the shear washer 16 there between. This plug and washer assembly is inserted into the axial passage 27 of the main body 12, as seen in FIG. 1, with the protruding, shear washer 16, resting on the upper edge 32 of the upper, body portion 24. The shear nut 13 is threaded unto the upper portion 24 of the main body thus gripping the protruding shear washer 16 rigidly between the shear nut 13 and the upper portion 24 of the body member 12. Thus, it can be seen that the plugs and washer assembly and the sheer nut combine to define a cap over the body member 12. The stop washer 18 is threaded into the top portion 47 of the shear nut 13, and the threaded rod 60 is inserted through the central passage 64 of the stop washer 18 and through the central passage 56 of the plug cover 15 and then threaded through the central passage 53 of the end plug 14.

The strain gauges 67-68 are mounted to the test region 36 of the body member 12 in accordance with the physical arrangements discussed above; and the gauges 67-68 are connected one to another in the Bridge 70 arrangement discussed above by wiring which is shielded by the protective sleeve 19. Input and output wiring to and from the Bridge 70 are terminated at the amphenol connector 20. The protective sleeve 19 is placed over the body member 12.

The Load Measuring Apparatus 10 is now pre-assembled, and ready-for-use in conjunction with a shaft and housing arrangement such as the valve operator 75, and together with an associated signal conditioning device 83 and, in some embodiments, an appropriate display, recording or calculating device 85. The signal conditioning device 83 is a device which provides appropriate voltage to the Wheatstone Bridge 70; accepts output voltage from the bridge 70 indicating the balance or degree of "out-of-balance" of the Bridge; and provides adjustable amplification for SPAN purposes. The signal conditioning device 83 is connected to the Load Measuring Apparatus 10 through the amphenol connector 20.

The Load Measuring Apparatus 10 is carried, together with the signal conditioning device 83 and appropriate display/recording device 85 to the location of the valve operator 75 which is to be tested. The ease of portability is a factor of the size and weight of the apparatus 10 as determined by the magnitude of force which the apparatus must be designed to test and to withstand. At the test site, the Load Measuring Apparatus 10 is readily mounted to the operator housing 80. In the disclosed embodiment, the particular operator 75 is depicted as a limitorque operator, as expressed above, which includes a centrally threaded, upper bearing plate 88 which is in axial alignment with the valve stem 77. Attention is directed to FIG. 2. The Load Measuring Apparatus 10 is mounted to the valve operator 75 by threading the lower body portion 26 of the body member 12 into the upper bearing plate 88. It is understood that various models of this limitorque design, valve operator 75 are designed with upper bearing plate 88 of larger or smaller central openings 89; and in these alternate embodiments of the housing mount adapter 44 is threaded to the lower body portion 26 (housing mount 26) to appropriately size the lower portion 26 for mounting in the respective bearing plate. (See FIG. 7.) It is further understood that the housing mount will be accomplished in alternate embodiments by methods other than threading, since not all valve operators (and other shaft and housing combinations) include a threaded bearing plate such as that of the Limitorque design.

With the Load Measuring Apparatus 10 mounted to the valve housing 80, the threaded rod 60 is turned to advance the rod through the central passage of the body member 12 until the rod makes contact with valve steam 77. The signal conditioning device 83 is plugged into the amphenol connector 20 and set to provide voltage and receive signals. Preferably, a combination display and recording device 85, such as a recording oscilloscope, is connected to receive output from the signal conditioning device 83. The Load Measuring Apparatus 10 and its associated system are now ready to begin measuring.

The valve operator 75 is operated to begin driving movement of the valve stem 77 in an upward direction (that is, pushing against the threaded rod). As the valve stem pushes on the rod, the upward moving force is transmitted from the rod to the end plug 14, to the shear washer 16, to the shear nut 13 and, thus, the force is transmitted to the body member 12 at the upper portion 24. As the shaft force transferred to the upper body portion 24 pulls on the body member 12 at one end, the body member is held at it's other end by the lower portion 26 mounted to the housing 80. The body member 12 begins to stretch and otherwise deform as does the test region 36 which deforms in amounts related to the force applied by the stem 77, as expressed above. The deformation of the test region 36 is detected by the strain gauge and represented by a change in the balance of resistances in the Wheatstone Bridge 70, as expressed above. The "out-of-balance" voltage signal is directed to the signal conditioning device 83 where it is amplified for SPAN purposes and output to the display device 85. Preferably the amplified signal at the display device 85 will be displayed and recorded in a readily converted ratio, for example, one volt equals 10,000 pounds.

As the force on the valve stem 77 increases and, thus, the force transmitted through the rod 60 to the plug 14 and shear washer 16 increases, the force will eventually cause the operator to cut-off in response to normal torque switch or limit switch operation. If the force reaches the washer's shearing forces, predetermined as above, the shear washer 16 will shear, thus allowing the end plug 14 and rod 60 to move freely within the shear nut and, thus, no force is transferred to the body member 12 or operator housing 80. Therefore, the valve steam 77 will reach its limits and cut off the operator motor in a manner known in the industry. The stop washer 18 acts as a backstop which retains the end plug 14 and rod 60 assembly loosely within the shear nut cavity 46 after shearing of the shear washer 16. The stop washer 18 is of material of sufficient strength to stop the plug and rod from being a projectile, but of low enough strength as to be easily broken by valve stem movement. It will be readily understood by reference to the above-mentioned assembly techniques that a replacement shear washer 16 is quickly and easily installed.

Figure 7:
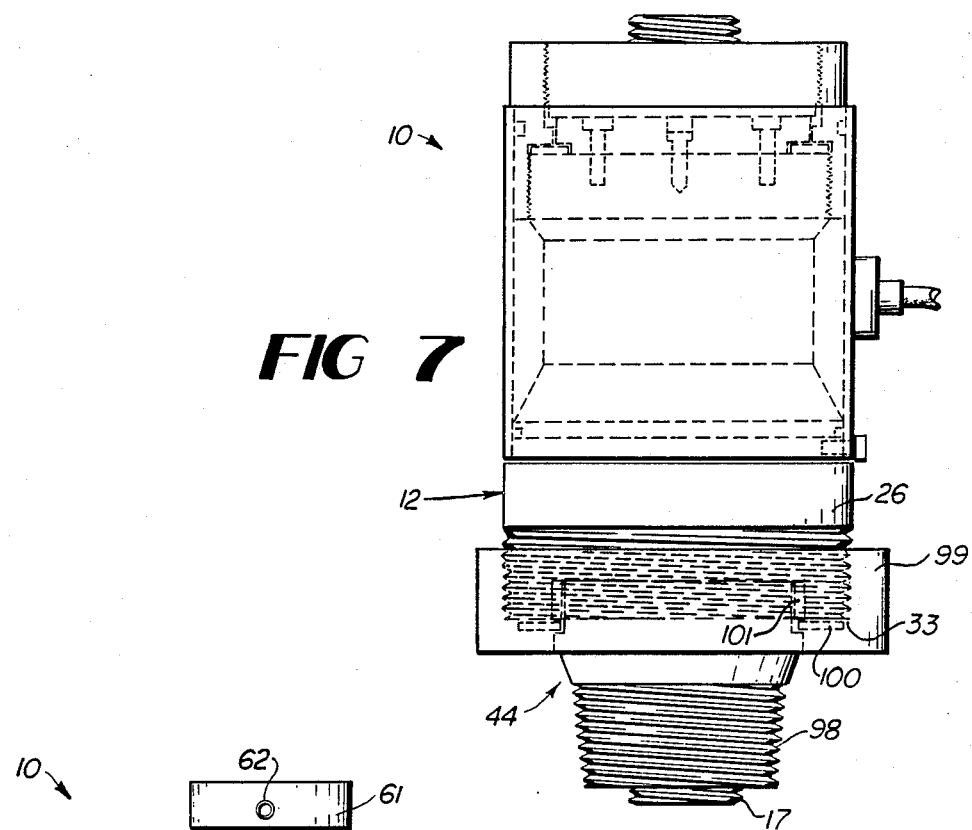
FIG. 7 is a side view, with portions cut away, showing the Load Measuring Apparatus of FIG. 1, with housing mount adaptor.

With reference to FIG. 7, the housing mount adapter 44 is seen, in an alternate embodiment, as including an adapter core 98, a core sleeve 101 threaded to the core 98, and adapter shear ring 100 held in a "vise" manner between the core and core sleeve, and an adapter nut 99. The core 98/sleeve 101/ring 100 assembly is held to the lower, mounting portion 26 of the body member 12 by threading the adapter nut 99 to the lower portion 26 and gripping the protruding ring 100 between the adapter nut and the lower edge 33 of the body member 12. This assembly functions similar to the shear washer 16 arrangement above. If the force exerted by the valve stem 77 exceeds the shearing force of this lower shear ring 100, the entire body member 12 moves away from the adapter core 98, which is retained within the valve housing 80.

Figure 9:
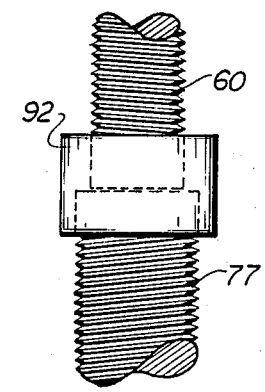
FIG. 9 is an isolated view of a connector component of one, alternate embodiment of the present invention.

In an alternate embodiment, an appropriately threaded sleeve connector 92 is threaded onto the top of the valve stem and then the threaded rod is threaded into the top of the sleeve connector; after which the main body member 12 of the Load Measuring Apparatus 10 is lowered onto and screwed into the housing. In this way, the valve stem interacts with the threaded rod as the stem moves in both axial directions. Reference is made to FIG. 9.

Figure 8:
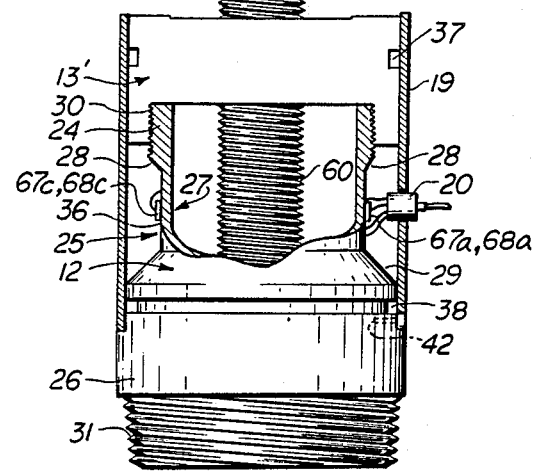
FIG. 8 is a cutaway, side view of the Ready-to-Use Load Measuring Apparatus of the present invention, showing an alternate embodiment of that of FIG. 1.

Another alternate embodiment of the present invention is seen in FIG. 8. The Load Measuring Apparatus 10 of this alternate embodiment replaces the end plug 14, plug cover 15, shear washer 16 and shear nut 13 assembly with a single component cap member 13' which does not provide the safety function of the shear washer 16 but does provide the force transfer function of the prior-mentioned assembly. All other components of this alternate embodiment of FIG. 8 are as described with respect to the preferred embodiment.

Whereas the present invention has been described in detail with specific reference to preferred embodiments thereof, it will be understood that variations and modifications can be effected within the spirit and scope of the invention, as described before and as defined in the appended claims.

We claim:

1. A load measuring apparatus for measuring the load delivered by a shaft which shaft moves relative to a shaft housing, said apparatus comprising:
   a body member for attachment to the shaft housing, said body member including, at least:
      an inner cylindrical wall defining a cylindrical passage extending axially through said body member;
      a housing mount portion whereby said body member is attachable to the shaft housing;
      an interface portion; and
      a test region defining a cylindrical region of said body member between said housing mount portion and said interface portion, said test region being deformable by forces acting on said body member;
   a plug segment occupying at least a portion of said cylindrical passage in said body member;
   plug supporting means for supporting said plug segment rigidly within said passage of said body member, said plug supporting means being so designed as to release its support of said plug segment when force on said plug segment exceeds a predetermined threshold force;
   a shaft engaging element extending from said plug segment into said passage of said body member for engagement with the shaft; and
   strain means for detecting deformation at said test region and for converting detected deformation to a signal representative of the force acting on said body member.

2. Apparatus of claim 1, wherein said plug supporting means comprises, at least, a shear washer defining a predetermined shear force and a gripping member cooperating with said interface portion of said body member to grip said shear washer at its outer periphery between said gripping member and said interface portion, and wherein said plug segment comprises, at least, a vise means for gripping said shear washer at its inner edge, whereby force exerted axially on said shaft engaging element in excess of said predetermined shear force breaks said shear washer, thus, releasing support of said plug segment.

3. Apparatus of claim 2, wherein said shear washer is removably gripped by said vice means of said plug segment and is removably gripped between said gripping member and interface portion, whereby a broken shear washer is replaceable by another shear washer.

4. Apparatus of claim 2, wherein said gripping member is releasably connected to said interface portion of said body member.

5. Apparatus of claim 1, wherein said shaft engaging element comprises, at least, a threaded rod threaded through said plug segment for selectively defining an adjustable length of rod within said passage of said body member.

6. Apparatus of claim 1 further comprising, at least, a backstop means for holding said plug segment and said shaft engaging element after rigid support of said plug segment is released by said plug supporting means.

7. A load measuring apparatus for measuring the load delivered by a shaft which shaft moves relative to a shaft housing, said apparatus comprising:
   a body member for attachment to the shaft housing, said body member including, at least:
      an inner cylindrical wall defining a cylindrical passage extending axially through said body member;
      a housing mount portion whereby said body member is attachable to the shaft housing, said housing mount portion defining a segment of external threading;
   an interface portion; and
   a test region defining a cylindrical region of said body member between said housing mount portion and said interface portion, said test region being deformable by forces acting on said body member;
   combination force transfer and release means interfacing with said interface portion of said body member for transferring force on the shaft to force acting on said body member and for negating the function of transferring force when the force on the shaft has exceeded a threshold value, whereby, once the threshold value is exceeded, force on the shaft is no longer transferred to force acting on the body member;
   strain means for detecting deformation at said test region and for converting detected deformation to a signal representative of the force acting on said body member; and
   adaptor means threaded to said housing mount portion and including, at least, an adapted housing mount segment of diameter different from the diameter of said housing mount portion and defining a segment of external threading.

8. A load measuring apparatus for measuring the load delivered by a shaft which shaft moved relative to a shaft housing, said apparatus comprising:
   a body member for attachment to the shaft housing, said body member including, at least:
      an inner cylindrical wall defining a cylindrical passage extending axially through said body member;
      a housing mount portion whereby said body member is attachable to the shaft housing;
      an interface portion; and
      a test region defining a cylindrical region of said body member between said housing mount portion and said interface portion, said test region being deformable by forces acting on said body member;
   a cap engaging said interface portion of said body member;
   shaft engaging element extending from said cap into said passage of said body member for engagement with the shaft; and
   strain means for detecting deformation at said test region and for converting detected deformation to a signal representative of the force acting on said body member.

9. Apparatus of claim 8, wherein said shaft engaging element comprises, at least, a threaded rod threaded through said cap for selectively defining an adjustable length of rod within said passage of said body member.

10. Apparatus of claim 8, wherein said strain means comprises at least one strain gauge attached to said test region, said strain gauge affecting a signal output in response to the detected deformation detected by said strain gauge, said signal output being representative of said force acting on said body member.

11. Apparatus of claim 10, wherein said strain gauge is connected electrically in a Wheatstone Bridge circuit.

12. Apparatus of claim 10, wherein said strain means further comprises amplification means for selectively amplifying said signal output.

13. Apparatus of claim 8, wherein said strain means comprises at least, a plurality of strain gauges attached to said test region, said strain gauges being arranged in at least two circumferentially displaced positions about said test region and said strain gauges being connected electrically in a Wheatstone Bridge circuit, wherein each said strain gauge detects deformation of said test region at its respective position about said test region, and wherein the voltage output of said Wheatstone Bridge circuit is representative of said force acting on said body member.

14. Apparatus of claim 13, wherein said plurality of strain gauges includes at least one gauge aligned with the maximum principal strain and at least one "poisson" gauge.

15. Apparatus of claim 13, wherein said plurality of strain gauges includes at least two gauges aligned with the maximum principal strain at positions displaced 180 degrees circumferentially about said test region and two poisson gauges at positions displaced 180 degrees circumferentially about said test region.

16. Apparatus of claim 15, wherein said plurality of strain gauges include four gauges aligned with the maximum principal strain at positions displaced 90 degrees circumferentially about said test region and four poisson gauges at positions displaced 90 degrees circumferentially about said test region.

17. Apparatus of claim 13, within said strain means further comprises amplification means for selectively amplifying said signal output from said Wheatstone Bridge circuit.

18. Apparatus of claim 8, wherein said cap comprises, at least:
   a gripping member connected to said interface portion of said body member, said gripping member defining a central, axial channel therethrough in co-axial alignment with said passage of said body member;
   a plug segment occupying at least a portion of said passage in said body member; and
   plug supporting means for supporting said plug segment within said passage of said body member, said plug supporting means being so designed a to release its support of said plug segment when force on said plug segment exceeds a pre-determined threshold force; and
   wherein said shaft engaging element extends from said plug segment into said passage of said body member.

19. Apparatus of claim 18, wherein said plug supporting means of said cap comprises, at least, a shear washer defining pre-determined shear force and wherein said plug segment comprises, at least, a vice means for gripping said shear washer at its inner edge, and wherein said shear washer is gripped at its outer periphery between said gripping member of said cap and said body member, whereby said plug segment is rigidly supported within said passage and whereby force exerted axially on said shaft engaging element in excess of said pre-determined shear force breaks said shear washer, thus, releasing support of said plug segment.

20. Apparatus of claim 19, wherein said shear washer is removeably gripped by said vice means of said plug segment and is removeably gripped between said gripping member and body member, whereby a broken shear washer is replaceable by another shear washer.

21. Apparatus of claim 19, wherein said gripping member of said cap is releasably connected to said interface portion of said body member.

22. Apparatus of claim 18, wherein said shaft engaging element comprises, at least, a threaded rod threaded through said plug segment for selectively defining an adjustable length of rod within said passage of said body member.

23. Apparatus of claim 18, further comprising, at least, a backstop means for holding said plug segment and said shaft engaging element after support of said plug segment is released by said plug supporting means.

24. Apparatus of claim 8, further comprising adapter means attached to said housing mount portion and including, at least, an adaptive housing mount segment of diameter different from the diameter of said housing mount portion.

25. Load Measuring Apparatus of claim 8 and further comprising in combination therewith, at least:
   a valve operator including an operator housing defining the shaft housing to which said body member is attached, and a valve stem driven by said valve operator in directions parallel to the axis of said valve stem, said valve stem defining the shaft moving relative to said housing, and said valve stem being aligned in co-axial alignment with said passage in said body member of said load measuring apparatus.

* * * * *